US006173384B1

(12) United States Patent
Weaver

(10) Patent No.: US 6,173,384 B1
(45) Date of Patent: Jan. 9, 2001

(54) METHOD OF SEARCHING FOR A DATA ELEMENT IN A DATA STRUCTURE

(75) Inventor: Jeff Weaver, Foster City, CA (US)

(73) Assignee: Nortel Networks Limited, Montreal (CA)

( * ) Notice: Under 35 U.S.C. 154(b), the term of this patent shall be extended for 0 days.

(21) Appl. No.: 09/021,970

(22) Filed: Feb. 11, 1998

(51) Int. Cl.[7] ........................................ G06F 12/00
(52) U.S. Cl. .................. 711/216; 711/202; 711/217; 711/200; 711/221; 711/220; 707/2; 370/389; 370/392; 370/60; 370/229
(58) Field of Search .................... 711/216, 202, 711/217, 221, 220, 200; 370/389, 392, 60, 229; 707/2

(56) References Cited

U.S. PATENT DOCUMENTS

| 5,414,704 | * | 5/1995 | Spinney ................................ 370/60 |
| 5,490,258 | * | 2/1996 | Fenner ................................ 395/401 |
| 5,546,390 | * | 8/1996 | Stone ................................ 370/60 |
| 5,613,110 | * | 3/1997 | Stuart ................................ 395/601 |
| 5,692,177 | * | 11/1997 | Miller ................................ 395/608 |
| 5,740,171 | * | 4/1998 | Mazzola et al. ..................... 370/392 |
| 5,778,069 | * | 7/1998 | Thomlinson et al. ................. 380/25 |
| 5,809,495 | * | 9/1998 | Loaiza .................................... 707/2 |
| 5,884,046 | * | 3/1999 | Antonov .......................... 395/200.68 |
| 5,909,440 | * | 6/1999 | Ferguson et al. ..................... 370/389 |
| 5,949,786 | * | 9/1999 | Bellenger ............................. 370/229 |
| 6,018,524 | * | 1/2000 | Turner et al. ........................ 370/392 |

OTHER PUBLICATIONS

Jain, Raj, "DEC–TR–593 A Comparison of Hashing schemes for Address Lookup in Computer Networks," Digital Equipment Corporation, cover and pp. 1–17, Apr. 12, 1989.

Lidl, Rudolf and Niederreiter, Harald, "Introduction to finite fields and their applications," c. 1994, cover, title page and pp. 1–43.

Lidl, Rudolf and Niederreiter, Harald, "Introduction to finite fields and their applications," c 1994, cover, title page and pp. 206–214.

Lidl, Rudolf and Niederreiter, Harald, "Introduction to finite fields and their applications," c. 1994, cover, title page and pp. 286–301.

Lidl, Rudolf and Niederreiter, Harald, "Introduction to finite fields and their applications," c. 1994, cover, title page and pp. 317–331.

Rocha, L.M., Syntatic Autonomy, Proceedings of the Jt. Conf. on the Science and Tech. of Intelligent Systems (ISIC/CIRA/ISAS 98), NIST, IEEE Press, pp. 706–711.

* cited by examiner

*Primary Examiner*—Eddie P. Chan
*Assistant Examiner*—Kimberly McLean
(74) *Attorney, Agent, or Firm*—Blakely Sokoloff Taylor & Zafman LLP

(57) ABSTRACT

A method for searching for a record in a table in a memory of a computer system. A table of records is organized into a group of arrays. A hashing algorithm locates a record in the table. Multiple hashing functions are executed concurrently, according to the number of arrays in the group, such that the record can be located relatively quickly in one of the arrays in the group. The table is analyzed to determine the information content of each bit in a string of bits comprising an index value associated with the table, according to Shannon's formula for information-theoretic entropy. The entropy associated with each bit in the string of bits provides a basis for selecting a subset of bits in the string of bits from which to obtain the seed values utilized in the hashing functions. A rotating mask, based on Neumann's code, is applied to the subset of bits to obtain different seed values for each of the hashing functions, thereby minimizing the correlation of the keys provided by the hashing functions.

25 Claims, 3 Drawing Sheets

METHOD OF SEARCHING FOR A DATA ELEMENT IN A DATA STRUCTURE

STATEMENT REGARDING FEDERALLY SPONSORED RESEARCH OR DEVELOPMENT

Not applicable.

BACKGROUND OF THE INVENTION

1. Field of the Invention

The present invention is related to the field of data structures stored in a memory of a computer system. More specifically, the present invention is related to a method for obtaining a seed value to be used as input to a hashing algorithm, the hashing algorithm providing a key for efficiently and quickly accessing records of a table in a memory of a computer system.

2. Description of the Related Art

There are numerous well known methods for searching for data in a data structure stored in a memory of a computer system to find a particular item of information. Certainly, it is appropriate to implement methods for organizing and searching for data in the data structure in a way that reduces the amount of memory required to store the data and perform the search in a more efficient manner. Before discussing such methods and the present invention, a brief mention of terms commonly used in the description of data structures and search techniques performed thereon is in order.

A table, or a file, comprises a group of data elements, each of which may be called an entry, or a record, in the table. Generally, an index value is associated with each record. The index value is used to identify the different records. The index value associated with a particular record may or may not need to be unique, depending on the search method utilized in accessing the table. Furthermore, the index value may be embedded within the record itself, or otherwise associated with the record.

A search method accepts one or more keys as input and attempts to locate a record within a table stored in the memory of a computer system whose associated index value matches the key. The search method may return the contents of the record, or a pointer to the record. The contents of the record may be data, program code, or a pointer to either data or program code, for example. If the search of a table is unsuccessful in finding the index value, then there is no record in the table associated with the index value. Typically, if the search is unsuccessful, a new record is added to the table with the key as its index value.

A table is stored in a data structure in the memory or an external storage, e.g., magnetic disk, of a computer system. The form of the data structure may be an array of records, a tree, a linked list, etc. Certain search methods are generally more applicable to one form and location of a data structure than another. Thus, the type and location of the data structure in which a table is stored is compatible with the search method used to access information within the table. For example, the present invention is related to search operations on a file or table that is organized as an array or group of arrays in a memory of an information handling device.

The efficiency and speed with which an algorithm searches for and identifies a record in a table is, understandably, a very important consideration in many fields of data computing. In particular, often utilized lookup routines benefit from and commonly rely on sophisticated techniques and schemes for accessing information in a data structure, particularly when accessing large databases of information. For example, optimized lookup routines are used in data communication networks to identify data packets, identify the destination for such data packets, and determine whether a data packet forwarding device should receive, forward, or filter such data packets. As data communication networks become larger and handle greater amounts of data traffic, the ability of data packet forwarding devices such as a bridge, switch, or router, or the like, to quickly identify addresses in data packets for purposes of determining whether and where to forward such data packets is paramount. To that end, what is needed is an improved method for searching for a record in a table, for example, searching for an entry in a forwarding database, indexed by a destination address, that indicates the port of a data packet forwarding device out of which data packets having the destination address should be forwarded by the data packet forwarding device. In particular, what is needed is a hashing algorithm in which the seed values input to the hashing algorithm are selected to achieve the best results in terms of reducing collisions and/or rehashing to find the desired record.

BRIEF SUMMARY OF THE INVENTION

The present invention relates to a computer implemented method for providing a seed value to be used as input to a hashing algorithm, which provides a key as output. The key generated by the hashing algorithm is utilized in searching for a record in a table in a memory of a computer system. The table of records is organized into an array in the memory. The table, or data of the kind stored in the table, is analyzed to determine and measure the information content of each bit in a string of bits comprising an index value associated with the records in the table, according to the well-known formula for determining information-theoretic entropy developed by Claude Shannon. The measurement of the amount of information content, or entropy, associated with each bit in the string of bits provides a basis for choosing a subset of the bits in the string of bits comprising the index value from which to obtain the seed values utilized in the hashing function. A rotating mask is iteratively applied to the subset of bits to obtain a number of different seed values for use in multiple iterations of the hashing function. The hashing function receives the seed values and produces a like number of alternate keys for use in searching the table, wherein if a collision occurs in a search utilizing a key, a different key is selected and the search performed again. The mask is selected and rotated to minimize the correlation of the keys provided by the hashing function. The well-known Neumann's code provides the basis for selecting and rotating the mask utilized in obtaining the seed values, such that the seed values are generally unique with respect to each other. Each of the subset of bits selected as a seed value are then compressed, providing a compressed, selected subset of bits such that the calculation of the key by the hashing function is simplified, thereby saving hardware or software resources otherwise required, depending on the implementation of the method.

Optionally, in the event the compressed, selected subset of bits representing a particular seed value are the same or similar to the compressed, selected subset of bits representing another seed value, one or both of the subset of bits may be folded, and the result(s) provided as the seed value(s) to the hashing function. By folding a compressed, selected subset of bits representing a particular seed value, the present invention ensures that different seed values input on different iterations of the hashing function are sufficiently unique to produce sufficiently unique keys for use in searching for a record in the table. In the event a collision occurs on a first search of the table utilizing a first key provided by a first iteration of the hashing function, a subsequent search of the table may be made with a second key provided by a second iteration of the hashing function, and so on. If a key matches the index value of a particular record, then the record being searched for has been found. If a match does not occur using a given key, i.e., if a collision occurs, the next key is compared against the index values of the records in the table to find a match, and so on, until a match is located or no further keys are provided by the hashing function. Optimally, the seed values, keys, and/or searches can be pipelined to reduce the time to locate a record in the table in the event a collision occurs on a search of the table.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention relates to a method for selecting a key for use in searching for a record in a table in a memory of a computer system. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Hardware Overview

Figure 1:
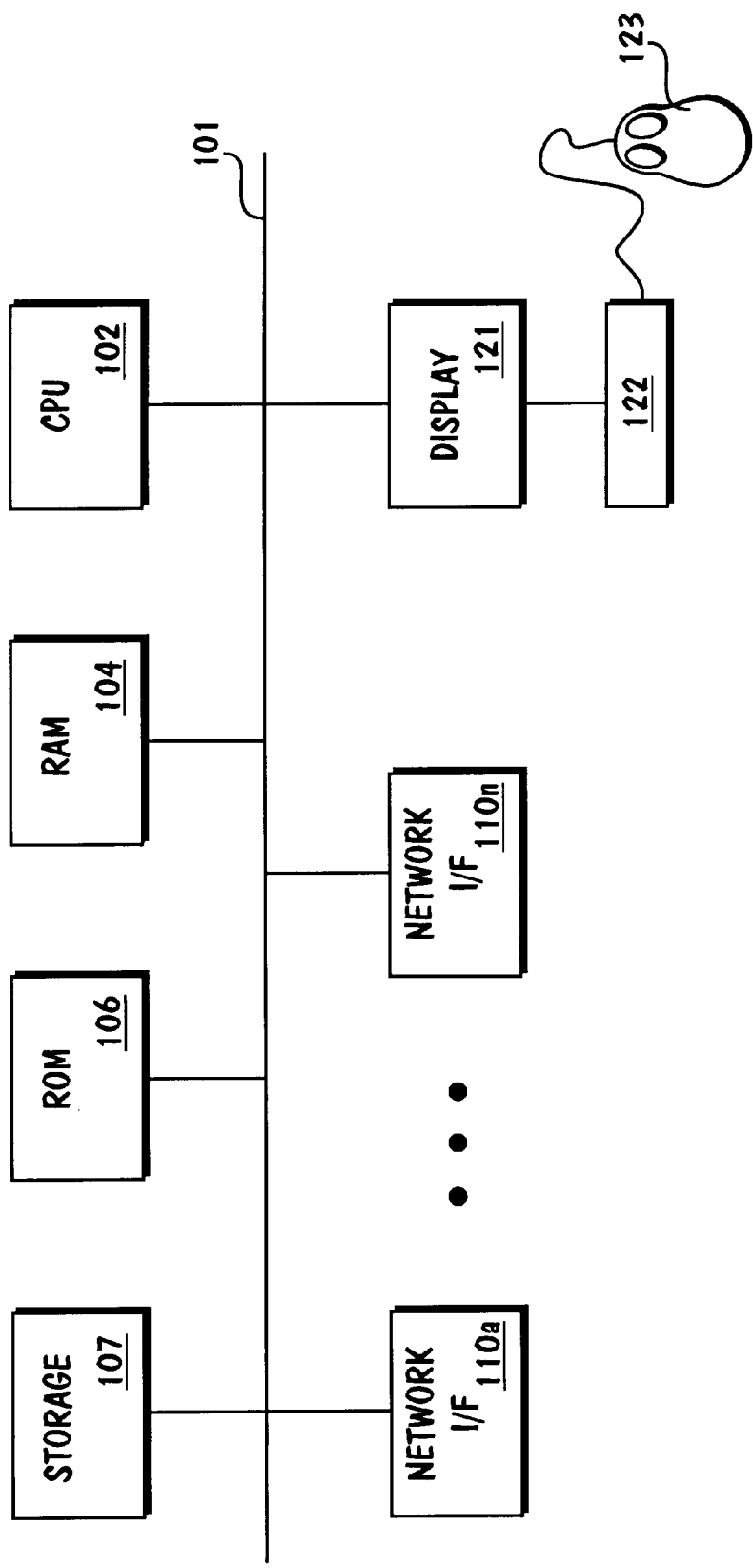
FIG. 1 illustrates a computer system upon which an embodiment of the present invention may be implemented.

Referring to FIG. 1, a computer system upon which an embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disk and its corresponding disk drive can be coupled to computer system 100. Data storage device 107 is coupled to bus 101 for storing information and instructions. One or more network interfaces 110a through 110n are coupled to bus 101 for receiving and transmitting information, e.g., in the form of data packets, over networks (not shown) coupled to the network interfaces. For example, computer system 100 may be a specialized computer system optimized to function as a data packet forwarding device, such as a bridge, router, switch, or the like, forwarding data packets between networks attached thereto. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), that allows the device to specify positions in a plane. An embodiment of the method described herein may be implemented in firmware in ROM 106, or software for controlling processor 102 to perform the steps of the method.

Detailed Description

The present invention calculates a seed value for input to a hashing function, which produces a key used in searching for an index value in a data structure, such as a forwarding table as may be maintained by a data packet forwarding device. The index value may be, for example, the destination media access control (MAC) address in the header of a data packet transmitted in an Institute for Electronic and Electrical Engineers (IEEE) 802.3 data network. The data structure maintains a potentially large number of entries, e.g., providing for destination MAC address to output port correlation for the data packet forwarding device. It should be noted that although an embodiment of the present invention is described in terms of creating a key for use in searching for a destination address in a forwarding table in a memory of a data forwarding device, it is appreciated by those of ordinary skill in the art that an embodiment of the present invention is generally applicable to generating a key for use in searching for an index value in a data structure maintained by an information handling device.

In a data packet forwarding device, a destination address is commonly used as the index value to locate the particular record in the forwarding database that contains the destination address, and other data associated with the destination address, e.g., a physical port number of the packet forwarding device out which a device to which the destination address is assigned can be reached. With that information, the data packet forwarding device can forward or filter a received data packet accordingly. A common search mechanism utilized to determine whether a given destination address is present in a forwarding database is a hashing function. A destination address from a received data packet is generally used as the seed value to the hashing function. Given that the number of bits utilized to specify a destination address in many data networking schemes is quite large, e.g., 48 bits to specify a destination MAC address in an IEEE 802.3 or Ethernet network, it is useful to reduce the number of bits provided to the hashing function as a seed value to simplify implementation and operation of the hashing function. Moreover, since the majority of bits may be the same value in corresponding bit positions from one destination address to another, using the full destination address from received data packets as the seed values for a hashing function may result in duplicate keys, i.e., two keys that point to the same location in the forwarding table, causing a collision, and the need to rehash or provide for some collision recovery process. Thus, the present invention carefully selects and reduces the number of bits from the destination address of a received data packet as a seed value, such that a search performed with a key generated by a hashing function receiving the seed value as input, reduces the chance of a collision, or if a collision occurs, reduces the number of subsequent searches required to find the index values, as will be described below.

Figure 2A:
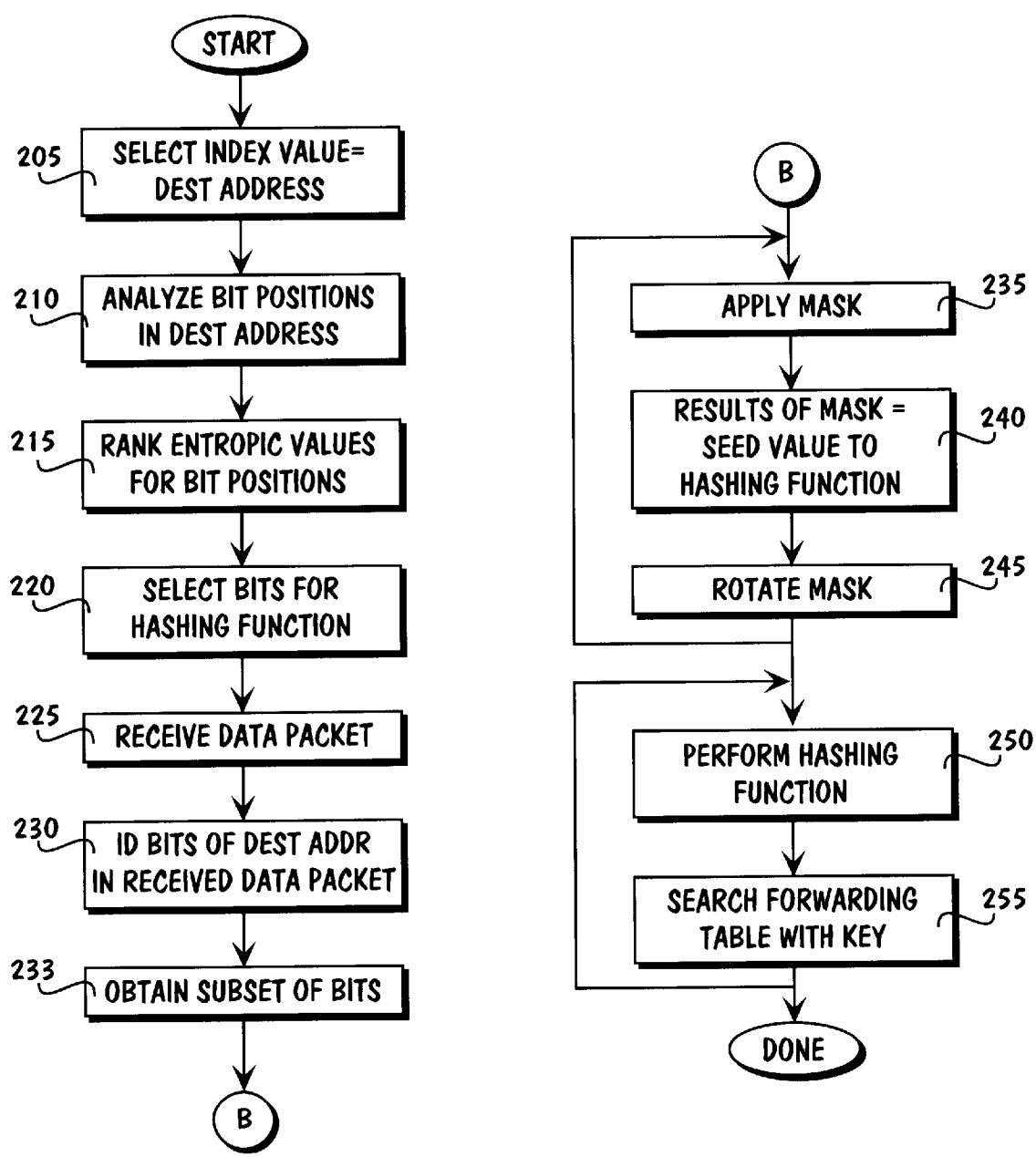
FIG. 2A provides a flow chart of steps relating to an embodiment of the method of the present invention.

With reference to FIG. 2A, a flow chart of the steps embodied by the present invention is provided. At step 205, an index value is selected for the table. In a forwarding table or database as may be utilized in a data packet forwarding device, the destination address, e.g., a MAC sublayer or Internet Protocol (IP) layer destination address included in the header of a data packet is commonly used to index forwarding, filtering and/or routing information maintained in the forwarding table. Thus, the destination address field in the forwarding table is used to index into the forwarding table, i.e., it is compared to a key derived from the destination address field of a received data packet to locate an entry, or record, in the forwarding table. The destination address field thus becomes the index value field for the forwarding table. The index value field, just like any other field, comprises a string of bits. Having selected a field in the records in the table to be used to index the table, the next step at 210 involves analyzing the information content of each bit in the string of bits comprising the index value field, so as to determine which bits in the destination address field of a received data packet to utilize for the seed value to the hashing function, rather than using all the bits in the received destination address field. Perhaps the easiest method of selecting bits of the destination address field is to simply truncate all but some number of bits of the destination address field, and utilize the remainder as a seed value input to the hashing function. However, in such case, the seed values may be the same, depending on which subset of bits are selected, resulting in similar keys, and, ultimately, collisions and rehashing. Therefore, at step 210, analysis is performed on the entries in the forwarding table or, for example, a trace of data traffic on the network to which the forwarding device is attached, to measure the information content of the bit positions in the destination address field of data packets transmitted on the network. The measurement can be thought of as being conducted on each column formed by each bit position in the destination address field in the forwarding table, or the same bit position in each data packet analyzed from a trace of network traffic. In one embodiment of the invention, the measurement of information content, otherwise known as the entropy, of each column, or bit position, in the destination address may be determined according to Claude Shannon's well known algorithm for determining information-theoretic entropy.

At steps 215 and 220, having determined an entropic value for each column, or bit position, in the destination address field, the present invention ranks the bit positions according to their associated measured value of information content. Those bit positions that change the most often, as among all of the bit positions in the destination address field in the table, or in a trace of network traffic, and thus have the higher entropic values, and the highest relative ranking, are selected, while those bit positions that change less often, and thus provide relatively little information content, are not selected. Those bit positions with the highest entropic values are selected for use in the seed value input to the hashing function to increase the probability that the hashing function successfully provides a key that matches an index value in the forwarding table on the first search of the table, thereby reducing the chance of a collision or necessity for collision recovery/rehashing. In summary, then, Shannon's algorithm determines a subset of the string of bits comprising the index value field of a record in a table, to be used as a seed value input to a hashing function.

After performing entropic analysis on the destination address field in data packets obtained from data traffic on the network or from the forwarding database at step 210, ranking entropic values for bit positions at step 215, and selecting the bit positions having the highest relative entropic values at step 220, the data packet forwarding device is ready to receive data packets from attached networks, and select the subset of bits in the destination address field of each data packet to be used in creating a seed value input to a hashing function. The data packet forwarding device receives a data packet at step 225 from an attached network at an input port. At step 230, the data packet forwarding device identifies the bits in the field of the data packet corresponding to the index value field in the forwarding table, e.g., the bits in the destination MAC address field. A subset of bits in the destination MAC address field is then selected at step 233. For example, 24 bits of a 48 bit destination MAC address may be identified as occupying those bit positions in the destination MAC address that have the highest entropic values, as determined by the analysis utilizing Shannon's algorithm, as described above in connection with steps 210–220. However, the subset of bits obtained at step 233 is still further reduced at step 235, before being input as a seed value to the hashing function, to simplify the software or firmware/circuitry utilized by the hashing function, depending on the implementation of an embodiment of the present invention, as explained further below.

At step 235, a mask is applied to select a reduced subset of bits identified and obtained in steps 230 and 233. The contents of the selected subset of bits are then buffered at step 240 as a seed value to a hashing algorithm, e.g., a polynomial equation. The mask is then rotated at step 245 in anticipation of selecting another reduced subset of bits for a subsequent iteration of the hashing function, in the event a collision occurs in a search utilizing the key generated from the first iteration of the hashing function, as explained further below. The mask, having been rotated, is again applied to the subset of bits identified in the destination address field of the received data packet to obtain a seed value for a subsequent hashing function. The results are provided as input to a second iteration of the hashing function, and the mask rotated again, at steps 240 and 245. Continuing in this manner, the mask is rotated and applied for as many iterations of the hashing function to be performed, so that the forwarding table can be searched multiple times, at step 255, with the results of, i.e., the keys generated by, each iteration of the hashing function. In one embodiment of the invention, the well known Neumann's code is utilized in selecting the mask, and rotating the mask for each seed value, to provide optimal differentiation between the seed values, thus ensuring the tendency for unique keys to be generated by each iteration of the hashing function. Thus, the present invention provides for the calculation of any number of unique keys prior to performing a search of the forwarding table. At step 250, the hashing function is performed. The result of the hashing function is provided as a key to the array comprising the forwarding table. Steps 235–245, or alternatively, steps 235–250, may be repeated depending on the number of keys desired. The present invention calculates a number of keys before performing the first search. The keys may be pipelined in the data packet forwarding device such that if a collision occurs in a search, a subsequent search can be undertaken immediately, utilizing another key. At step 255, a search is performed using a first key. In the event a collision occurs in the first search using the first key, a subsequent search can be immediately performed utilizing the second key, and so on, to the extent steps 235–250 have been performed multiple times. Alternatively, only the seed values may be calculated, and steps 250–255 repeated until a record is found or no more seed values are provided as input. In one embodiment, multiple seed values, multiple iterations of the hashing function, multiple keys, or multiple iterations of the search may be pipelined so that regardless of whether one or more collisions occur in searching for a record in the forwarding table, the present invention provides for a search function that is nearly perfect and provides constant look up times, regardless of the size of keys utilized.

Figure 2B:
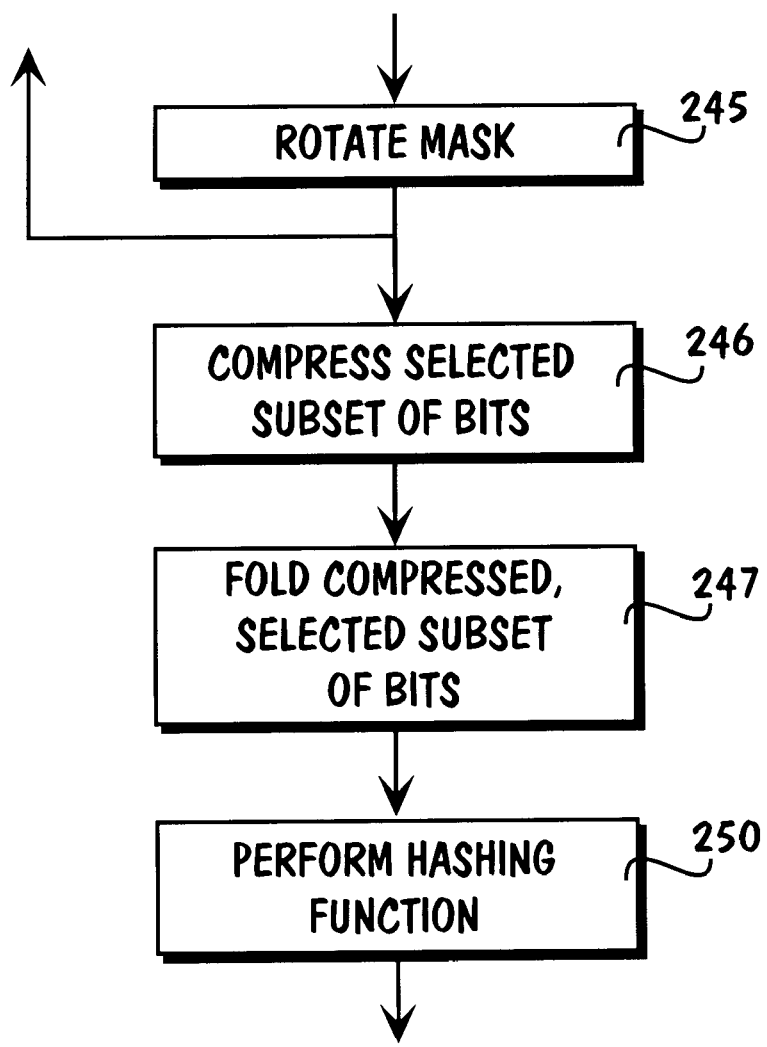
FIG. 2B provides a flow chart of additional steps relating to an embodiment of the method of the present invention.

With reference to FIG. 2B, in an alternative embodiment of the method of the present invention, having obtained some number of seed values as described above with respect to steps 205 through 245, each of the seed values, comprising a selected subset of bits, may be compressed to create a compressed, selected subset of bits, e.g., utilizing the well known Galois compression algorithm. Using a compressed selected subset of bits as the seed value simplifies calculation of the key in the subsequent hashing function. Also, in the rare event that two similar seed values are produced according to the method described herein, the seed values can be folded into themselves, using, for example, a Boolean exclusive-OR function, wherein the first x bits of the seed value are exclusive-ORed with a successive x bits of the seed value, which, in turn, is exclusive-ORed with yet another successive x bits of the seed value, and so on. The seed values are then input to the hashing algorithm to generate keys utilized in searching for a record in the forwarding table.

What is claimed is:

1. In an information handling device having a table of data elements, a method for searching for a received data element in the table of data elements:
   a) selecting a like portion of each data element as an index value for differentiating between the data elements in the table, the portion comprising a contiguous string of bits located at like bit positions in each data element in the table such that the same bit positions from each data element form a logical column in the table;
   b) measuring the information content for each logical column;
   c) ranking each logical column according to the amount of information content associated with each logical column;
   d) selecting a set of logical columns in the portion having a rank at or above a desired rank;
   e) receiving a data element at the information handling device;
   f) identifying a set of bit positions in a portion of the received data element corresponding to the selected set of columns;
   g) applying a mask to the set of bit positions in the portion of the received data element to create a reduced set of bit positions in the portion of the received data element;
   h) providing the content of each bit position in the reduced set of bit positions in the portion of the received data element as one of a plurality of keys to be input to a hashing function, the hashing function providing the index value for a data element to be searched for in the table corresponding to the received data element; and
   i) rotating the mask;
   j) repeating steps g) through i) according to the plurality of keys desired, the mask being rotated in such a manner as to minimize correlation among the plurality of keys;
   k) performing hashing functions to obtain a plurality of index values, each hashing function utilizing a unique one of the plurality of keys;
   l) searching the table for the index value to locate the received data element.

2. The method of claim 1, wherein applying a mask to the set of bit positions in the portion of the received data element to create a reduced set of bit positions in the portion of the received data element includes applying a mask based on Neumann's code to the set of bit positions in the portion of the received data element to create a reduced set of bit positions in the portion of the received data element.

3. A method for providing a seed value for input to a hashing function, the hashing function providing a key for searching for a data element in a table of data elements, comprising:
   a. identifying a subset of bit positions in an index field associated with each of the data elements in the table;
   b. receiving a data element for which to search in the table of data elements;
   c. selecting a subset of bits in the received data element corresponding to the identified subset of bit positions in the index field;
   d. applying a mask to reduce the selected subset of bits in the received data element; and
   e. providing the reduced subset of bits from the received data element as the seed value input to the hashing function.

4. The method of claim 3, wherein applying a mask to reduce the selected subset of bits in the received data element comprises applying a mask based on Neumann's code to reduce the selected subset of bits in the received data element.

5. The method of claim 4, further comprising compressing the reduced subset of bits obtained from applying a mask to reduce the selected subset of bit positions in the received data element.

6. The method of claim 5, wherein providing the reduced subset of bits from the received data element as the seed value input to the hashing function comprises providing the compressed, reduced subset of bits from the received data element as the seed value input to the hashing function.

7. The method of claim 5, further comprising folding the compressed, reduced subset of bits from the received data element.

8. The method of claim 7, wherein providing the reduced subset of bits from the received data element as the seed value input to the hashing function comprises providing the folded, compressed, reduced subset of bits from the received data element as the seed value input to the hashing function.

9. A method for providing a seed value for input to a hashing function, the hashing function providing a key for searching for a data element in a table of data elements, comprising:
   a. identifying a subset of bit positions in an index value associated with each of the data elements in the table;
   b. receiving a data element for which to search in the table of data elements;
   c. selecting a subset of bits in that portion of the received data element corresponding to the identified subset of bit positions in the index value; and
   d. repeating, to provide as many seed values as desired for input to a like number of iterations of the hashing function:
      i. applying a mask to reduce the subset of bits in the received data element corresponding to the identified subset of bit positions in the index value;
      ii. providing the reduced subset of bits from the received data element as the seed value input to the hashing function; and
      ii. rotating the mask.

10. The method of claim 9, wherein rotating the mask comprises rotating the mask according to Neumann's code to provide differentiation between the seed values.

11. The method of claim 10, further comprising performing the hashing function to provide a key for each iteration of d.

12. The method of claim 1, wherein measuring the information content for each logical column comprises measuring the entropic value of each logical column.

13. The method of claim 12, wherein measuring the entropic value of each logical column comprises measuring the entropic value of each logical column in accordance with an information-theoretic entropy algorithm.

14. The method of claim 13, wherein measuring the entropic value of each logical column in accordance with an information-theoretic entropy algorithm comprises measuring the entropic value of each logical column in accordance with a well known information-theoretic entropy algorithm.

15. The method of claim 14, wherein measuring the entropic value of each logical column in accordance with a well known information-theoretic entropy algorithm comprises measuring the entropic value of each logical column in accordance with Claude Shannon's information-theoretic entropy algorithm.

16. The method of claim 3, wherein identifying a subset of bit positions in an index field associated with each of the data elements in the table comprises identifying a subset of bit positions in an index field associated with each of the data elements in the table, wherein the value for each bit position in the identified subset of bit positions varies more among the data elements than the value for each bit position in the bit positions in the index field not identified.

17. The method of claim 16, wherein identifying a subset of bit positions in an index field associated with each of the data elements in the table, wherein the value for each bit position in the identified subset of bit positions varies more among the data elements than the value for each bit position in the bit positions in the index field not identified, comprises:
   a) measuring the information content of each of the bit positions in the index field; and
   b) ranking the bit positions in the index field based on the measure of information content of each of the bit positions in the index field; and
   b) identifying a subset of bit positions in the index field having a higher relative measure of information content.

18. The method of claim 17, wherein measuring the information content of each of the bit positions in the index field comprises measuring the entropic value of each of the bit positions in the index field.

19. The method of claim 18, wherein measuring the entropic value of each of the bit positions in the index field comprises measuring the entropic value of each of the bit positions in the index field in accordance with an information-theoretic entropy algorithm.

20. The method of claim 19, wherein measuring the entropic value of each of the bit positions in the index field in accordance with an information-theoretic entropy algorithm comprises measuring the entropic value of each of the bit positions in the index field in accordance with Claude Shannon's information-theoretic entropy algorithm.

21. The method of claim 9, wherein identifying a subset of bit positions in an index value associated with each of the data elements in the table comprises identifying a subset of bit positions in an index value associated with each of the data elements in the table that have a higher relative information content than the bit positions in the index value not so identified.

22. The method of claim 21, wherein identifying a subset of bit positions in an index value associated with each of the data elements in the table that have a higher relative information content than the bit positions in the index value not so identified comprises identifying a subset of bit positions in an index value associated with each of the data elements in the table that have a higher entropic value than the bit positions in the index value not so identified.

23. In an information handling device having a table of data elements, a means for searching for a received data element in the table of data elements, comprising:
   means for selecting a portion of each data element as an index value for differentiating between the data elements in the table, the portion comprising a string of bits located at bit positions in each data element in the table such that the bit positions from each data element form a logical column in the table;
   means for measuring the information content for each logical column;
   means for ranking each logical column according to the information content associated with each logical column;
   means for selecting a set of logical columns in the portion based on their ranking;
   means for receiving a data element at the information handling device;
   means for identifying a set of bit positions in a portion of the received data element corresponding to the selected set of columns;
   means for applying a mask to the set of bit positions in the portion of the received data element to create a reduced set of bit positions in the portion of the received data element;
   means for providing the content of each bit position in the reduced set of bit positions in the portion of the received data element as one of a plurality of keys to be input to a hashing function, the hashing function providing the index value for a data element to be searched for in the table corresponding to the received data element; and
   means for performing the hashing function to obtain an index value utilizing the one of the plurality of keys;

means for searching the table for the index value to locate the received data element.

24. An article of manufacture comprising a machine readable medium having a plurality of machine readable instructions stored thereon, wherein the instructions, when executed by a processor, cause the processor to:

identify a subset of bit positions in an index field associated with each of the data elements in the table;

receive a data element for which to search in the table of data elements;

select a subset of bits in the received data element corresponding to the identified subset of bit positions in the index field;

apply a mask to reduce the selected subset of bits in the received data element; and provide the reduced subset of bits from the received data element as the seed value input to the hashing function.

25. The article of manufacture of claim 24, wherein the instructions that cause the processor to identify a subset of bit positions in an index field associated with each of the data elements in the table comprises instructions that cause the processor to identify a subset of bit positions in an index field associated with each of the data elements in the table, wherein the value for each bit position in the identified subset of bit positions varies more among the data elements than the value for each bit position in the bit positions in the index field not identified.

* * * * *